Aug. 19, 1969     O. D. FENTON     3,462,689
ELECTRONIC TEST PROBE HAVING MEANS FOR
SWITCHING FROM GENERATING TO
AMPLIFYING FUNCTION
Filed April 30, 1965
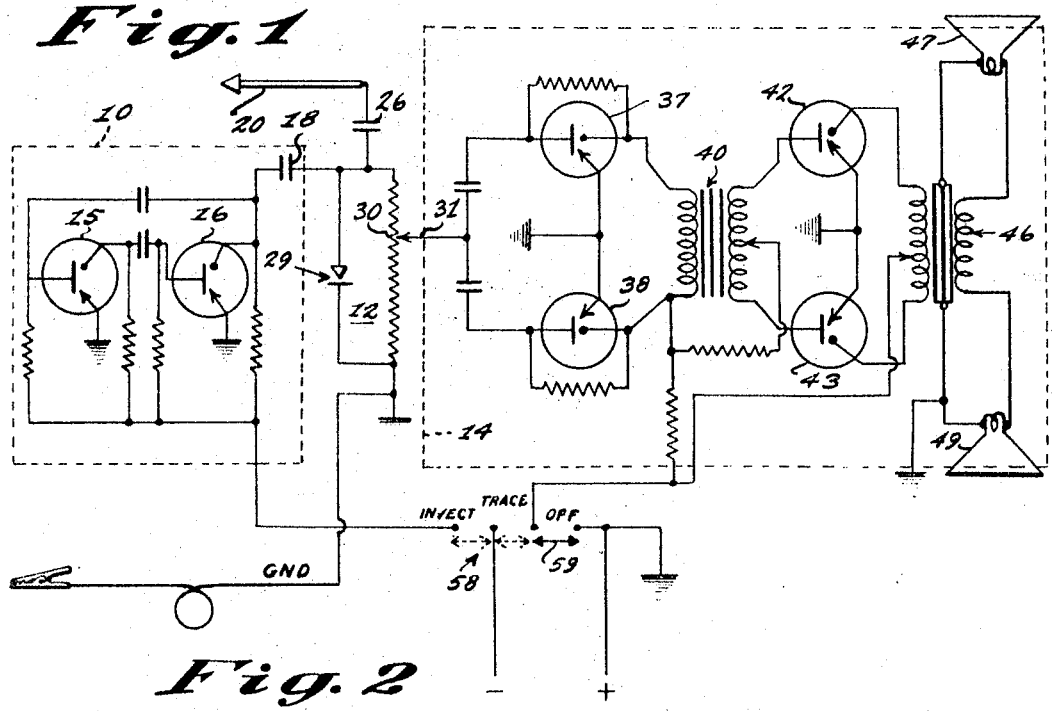
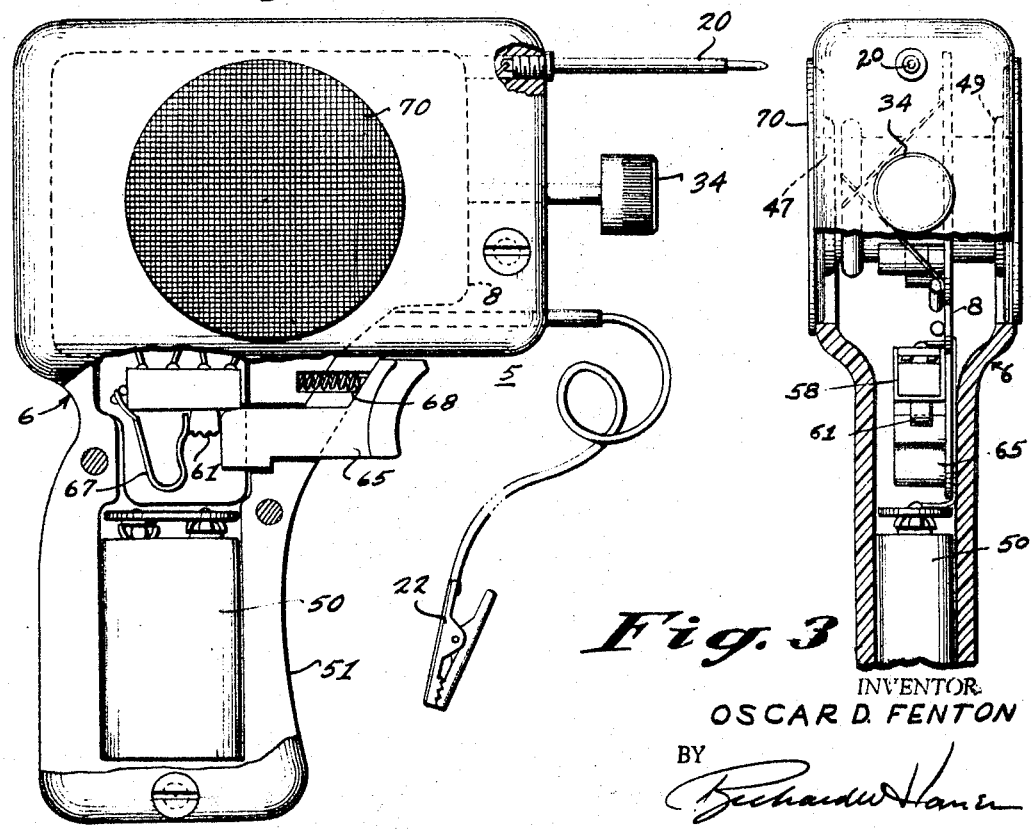
INVENTOR.
OSCAR D. FENTON
BY
ATTORNEY United States Patent Office 3,462,689
Patented Aug. 19, 1969

3,462,689
ELECTRONIC TEST PROBE HAVING MEANS FOR SWITCHING FROM GENERATING TO AMPLIFYING FUNCTION
Oscar D. Fenton, 606 Manitoba Drive, Colorado Springs, Colo. 80910
Filed Apr. 30, 1965, Ser. No. 452,402
Int. Cl. G01r 1/06, 15/12; H04b 1/00
U.S. Cl. 325—363                    5 Claims

ABSTRACT OF THE DISCLOSURE

The invention includes a signal generator and a separate audio frequency amplifier housed in a gun shaped case having a probe electrically coupled to each of said circuits, internally mounted loudspeakers and a trigger mechanically coupled with means for selectively activating the generator or the amplifier.

---

The present invention relates to electronic test equipment and more specifically to apparatus adapted for signal tracing and signal insertion as a means of isolating and locating malfunctions in audio frequency and audio frequency modulated electronic apparatus.

The technique of "troubleshooting" a radio or audio amplifier using a signal generator to insert a signal at a specific stage has been practiced for a long period of time as has the concept of measuring or listening to the natural signal development of the circuit at chosen points along its electrical path. To accomplish these tests however, at least two and perhaps more pieces of equipment are required, such as a separate signal generator and a vacuum tube voltmeter or other form of natural signal amplifier and transducer. Most fault finding procedures call for a system of signal search starting with the output end of the circuit and progressing backwardly along the stages of amplification, detection or oscillation to determine the exact location of breakdown. Signal generators have also been widely used to insert a signal into the faulty circuit to learn the exact position at which it is interrupted or distorted. Very often, if not practically always, both methods are employed, and inconvenience and time expenditure are not uncommon by-products of the fact that these pieces of equipment are placed in separate chassis or housings, and separate test leads must be used to employ both pieces of test equipment.

It is, therefore, the primary objective of the present invention to provide a single piece of test equipment which will accomplish both tasks with the same test probe, and further will alternatively act as generator, detector or amplifier according to the setting of an operator controlled trigger switch.

A further objective involves the provision of a single housing which operatively interconnects a signal generator and amplifier so that either equipment may be employed with no waste in motion or time.

A further objective of the invention is to provide a combination of parts which may be adapted to a hand-held housing which will be of such light weight and small size as to permit a technician to hold and operate the entire instrument easily with one hand.

Other and still further objects, features and advantages of the inventive combination will become apparent or will be specifically pointed out in the detailed description of a preferred form of the invention which follows in connection with the accompanying drawings in which:

FIGURE 1 is a schematic diagram of the electrical circuit of the preferred form of the invention.

FIGURE 2 is a side elevational view of the gun shaped-pistol grip housing which carries the electrical components and test probe essential to the operation of the device. Portions are broken away and shown in cross section to more clearly illustrate the interior construction.

FIGURE 3 is an end elevational view of the printed circuit board housed in the gun shaped case showing the mounting of two loudspeakers. Typical components are shown in dashed lines.

Prior to describing in detail the preferred forms of the invention, it should be stated in summary that the invention broadly comprises the combination of a signal generator and signal detector and amplifier as a single unit whose function can be selectively actuated and directed by a trigger-switched hand-held probe.

The preferred form of the invention is shown best in FIGURE 2 where the test instrument 5 is illustrated as a whole. A hollow molded plastic case 6 serves to house the electronic components schematically shown in FIGURE 1. In accordance with modern electronic practice, the amplifying devices are all solid state and can be easily mounted in a manner well known in the art to a printed circuit board 8 which in turn is supported by any convenient means inside the gun shaped case 6. The circuitry is depicted in FIGURE 1 and consists generally of an audio frequency signal detector 10, shown for clarity inside a dashed line block, a radio frequency detector or demodulator 12 and an untuned audio frequency amplifier 14, shown for clarity to the right hand side of a dashed bracket line.

The signal generator 10 comprises a regenerative audio frequency oscillator employing two transistors 15 and 16 interconnected in a manner well known in the art. The specific frequency of the signal generated is determined by the components used, and, preferably should be in the mid-audio range, however, the exact frequency is not an important consideration. The output of the oscillator is coupled through an isolating capacitor 18 to an elongated metallic test probe 20, which in combination with the ground test lead 22, also emerging from the housing 6, establishes the output terminals of the oscillator which may be connected at any desired circuit point in equipment to be tested. Of course, the ground lead is connected only once to the chassis or common ground potential of the circuit to be tested, and the probe may then be placed on any point at which it may be desirable to insert or detect a signal for test purposes.

The test probe 20 is also coupled through a capacitor 26 to the diode detector 12, comprising a diode 29 across which is bridged a resistor 30. Since the low voltage side of the resistor is connected to a point of ground potential, the sliding wiper arm 31 of the resistor 30 serves to tap the audio voltage output of the detector in the manner of a volume or gain control whose control knob 34 is also exposed to the outside of the housing 6.

A first stage of audio frequency current amplification is achieved by transistor 37 and 38 whose output is impressed across the winding of a coupling transformer 40.

The transformer output is delivered to a push-pull audio stage comprising transistors 42 and 43 and through a matching transformer 46 to a pair of loudspeakers 47 and 49.

Both the signal generator 10 and amplifier 14 are powered from a dry cell battery 50 disposed in the handle 51 of the gun housing 6. Wiring connections are employed to provide plus and minus voltages on two terminals of a three position slide switch 58. In FIGURE 1, the slider 59 is shown in one position in solid line and the other two positions in dashed lines, it being understood that the two terminals illustrated directly above the pointed ends of the slider 59 are considered to be electrically tied together when the slider is in the solid line position. The electrical portion 59 of the slider is connected to an actuating button 61, seen in FIGURE 2, which is positioned to abut the rear actuating surface of a slidable and reciprocal trigger 65 mounted in the case 6 and exposed for manipulation by an operator's finger. A pair of biasing springs 67 and 68 are arranged to push outwardly against the pressure of the depressing finger of the operator so as to deactuate the switch and interrupt the current flow from the battery to the generator 10 or amplifier 14.

On the housing, the loudspeakers 47 and 49 are mounted so that the periphery of the cone is substantially flush with the side wall surface of the case 6. A grill 70 covers each of the loudspeakers.

In operation, the ground lead 22 is clipped to the chassis or common ground of the equipment to be tested and the tip of the test probe 20 is placed in contact with a terminal on which signal voltage is supposed to be present. If a signal is in fact present, either as a modulated radio frequency or an audio frequency voltage, a tone will be heard in loudspeaker 47 and 49, assuming of course that the trigger 65 has been depressed to actuate the switch 58 to the "trace" position. Using the probe and amplifier in this manner, a signal may be traced forward or backward through the sequential stages of a receiver, amplifier or similar equipment. The novel features of the present invention are best demonstrated when it becomes necessary to switch from signal tracing to signal injection in order to isolate open or shorted circuits or to compare waveforms or signal quality. Without removing the probe 20 from the terminal, the hand-held instrument may be quickly and easily converted from its tracing amplifier function to a signal generator function by merely pulling the trigger 65 to its most rearwardly position, thus deactivating the amplifier 14 and supplying voltage to the generator 10. It will be quickly apparent to those skilled in the art that the device described herein will simplify maintenance and troubleshooting while greatly reducing the time required for these functions.

Having thus described the several useful and novel features of the audio and modulated radio frequency test apparatus of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:
1. An electronics test instrument comprising;
   a housing having a pistol grip and including a trigger;
   an audio frequency signal generator disposed in the housing;
   an audio frequency amplifier disposed in the housing;
   an elongated metallic probe carried by said housing and electrically coupled to the output of the signal generator and the input of the said amplifier;
   a source of electrical power; and
   switch means mechanically interconnected to the trigger and electrically interconnecting said electrical power source and the signal generator and amplifier.

2. A test instrument for electronic apparatus including;
   a housing a pistol grip;
   trigger means carried by said housing;
   a metallic probe protruding from the housing and disposed for contact with the terminals of electrical apparatus;
   an electrical signal generator having an output and means coupling said output to the probe;
   an electrical signal amplifier having an input and means coupling said probe to said input;
   an electrical power source; and
   means selectively connecting said power source to the signal generator and signal amplifier, said means operatively connected to said trigger means.

3. A test instrument for electronic apparatus including;
   a housing having a pistol grip;
   trigger means carried by said housing;
   a metallic probe protruding from the housing and disposed for contact with the terminals of electrical apparatus;
   an electrical signal generator having an output and means coupling said output to the probe;
   an electrical signal amplifier having an input and means coupling said probe to said input;
   transducer means mounted in said housing and electrically connected to the output of the signal amplifier;
   an electrical power source; and
   means selectively connecting said power source to the signal generator and signal amplifier, said means operatively connected to said trigger means.

4. A test instrument for electronic apparatus including;
   a housing having a pistol grip;
   trigger means carried by said housing;
   a metallic probe protruding from the housing and disposed for contact with the terminals of electrical apparatus;
   demodulator means having a diode rectifier and coupled to said probe;
   an electrical signal amplifier having an input and means coupling said input to the said demodulator;
   an electrical power source; and
   means selectively connecting said power source to the signal generator and signal amplifier, said means operatively connected to said trigger means.

5. A test instrument for testing electronic apparatus in which either or both audio frequency signals and audio frequency modulated radio frequency signals appear comprising;
   a gun shaped housing having a pistol grip and movable trigger means;
   an elongated test prod mounted on said housing in the position of a gun barrel;
   an audio frequency tone generator having an output;
   means coupling said audio output to the test prod;
   a diode detector coupled to the test prod and adapted to demodulate a radio frequency signal appearing on the probe;
   an untuned amplifier having an input and output;
   means connecting the detector to the input of the amplifier;
   at least one loudspeaker mounted in the housing;
   means connecting the loudspeaker to the output of the amplifier;
   power supply means including a dry cell battery mounted within the pistol grip portion of the housing;
   switch means operably connected to said trigger for selective positioning; and means including said switch means interconnecting said battery with the tone generator and with said amplifier whereby electrical power can be selectively applied to either the generator or amplifier by operation of the trigger.

References Cited

UNITED STATES PATENTS 1,986,414  1/1935  Saunders _____ 325—363 XR

OTHER REFERENCES

Shields, J. P., Two-Way Instrument Checks TV's and Radios. In Radio-Electronics. pp. 58–59. August 1956.

KATHLEEN H. CLAFFY, Primary Examiner

R. S. BELL, Assistant Examiner

U.S. Cl. X.R.

179—1; 324—73, 149